(12) United States Patent
Fujihara et al.

(10) Patent No.: US 11,420,339 B2
(45) Date of Patent: Aug. 23, 2022

(54) ARTICLE HOLDING DEVICE AND ARTICLE HOLDING SYSTEM

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Hiroaki Fujihara, Kawasaki (JP); Sayo Yamamoto, Yokohama (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 115 days.

(21) Appl. No.: 16/907,991

(22) Filed: Jun. 22, 2020

(65) Prior Publication Data
US 2020/0316787 A1     Oct. 8, 2020

Related U.S. Application Data

(63) Continuation of application No. PCT/JP2018/033675, filed on Sep. 11, 2018.

(30) Foreign Application Priority Data

Dec. 22, 2017     (JP) .............................. JP2017-246761

(51) Int. Cl.
*B25J 15/06* (2006.01)
*B25J 15/00* (2006.01)
(Continued)

(52) U.S. Cl.
CPC ......... *B25J 15/0052* (2013.01); *B25J 9/1612* (2013.01); *B25J 13/08* (2013.01); *B25J 15/0028* (2013.01); *B25J 15/0616* (2013.01)

(58) Field of Classification Search
CPC ...... B25J 9/1612; B25J 13/08; B25J 15/0028; B25J 15/0052; B25J 15/0616
See application file for complete search history.

(56) References Cited

U.S. PATENT DOCUMENTS

| | | |
|---|---|---|
| 5,501,498 A | 3/1996 | Ulrich |
| 2010/0078953 A1 | 4/2010 | Ban et al. |

(Continued)

FOREIGN PATENT DOCUMENTS

| | | |
|---|---|---|
| JP | 3-113785 U | 11/1991 |
| JP | 6-328383 A | 11/1994 |

(Continued)

OTHER PUBLICATIONS

International Search Report dated Nov. 27, 2018 in PCT/JP2018/033675 filed Sep. 11, 2018, 2 pages.

*Primary Examiner* — Saul Rodriguez
*Assistant Examiner* — Brendan P Tighe
(74) *Attorney, Agent, or Firm* — Oblon, McClelland, Maier & Neustadt, L.L.P.

(57) ABSTRACT

A holding technology whereby an article, i.e., a subject to be held, can be stably held by increasing a contact area with respect to the article. An article holding device includes a holding main body, a suction mechanism, and a sandwiching mechanism. The sandwiching mechanism includes sandwiching arms, which come into contact with one side of the article, and a board-like sandwiching plate that comes into planar contact with the other side of the article.

6 Claims, 12 Drawing Sheets

(51) Int. Cl.
*B25J 9/16* (2006.01)
*B25J 13/08* (2006.01)

(56) References Cited

U.S. PATENT DOCUMENTS

| | | | |
|---|---|---|---|
| 2014/0214202 A1 | 7/2014 | Nammoto et al. | |
| 2016/0016311 A1* | 1/2016 | Konolige | B25J 15/0616 700/245 |
| 2019/0084762 A1 | 3/2019 | Fujihara et al. | |
| 2020/0223634 A1* | 7/2020 | Arase | B25J 19/021 |

FOREIGN PATENT DOCUMENTS

| | | |
|---|---|---|
| JP | 7-328976 A | 12/1995 |
| JP | 8-318488 A | 12/1996 |
| JP | 2000-61875 A | 2/2000 |
| JP | 2001-205584 A | 7/2001 |
| JP | 2005-230999 A | 9/2005 |
| JP | 2007-83331 A | 4/2007 |
| JP | 2010-5736 A | 1/2010 |
| JP | 2010-110846 A | 5/2010 |
| JP | 4708464 B2 | 6/2011 |
| JP | 2014-144526 A | 8/2014 |

* cited by examiner

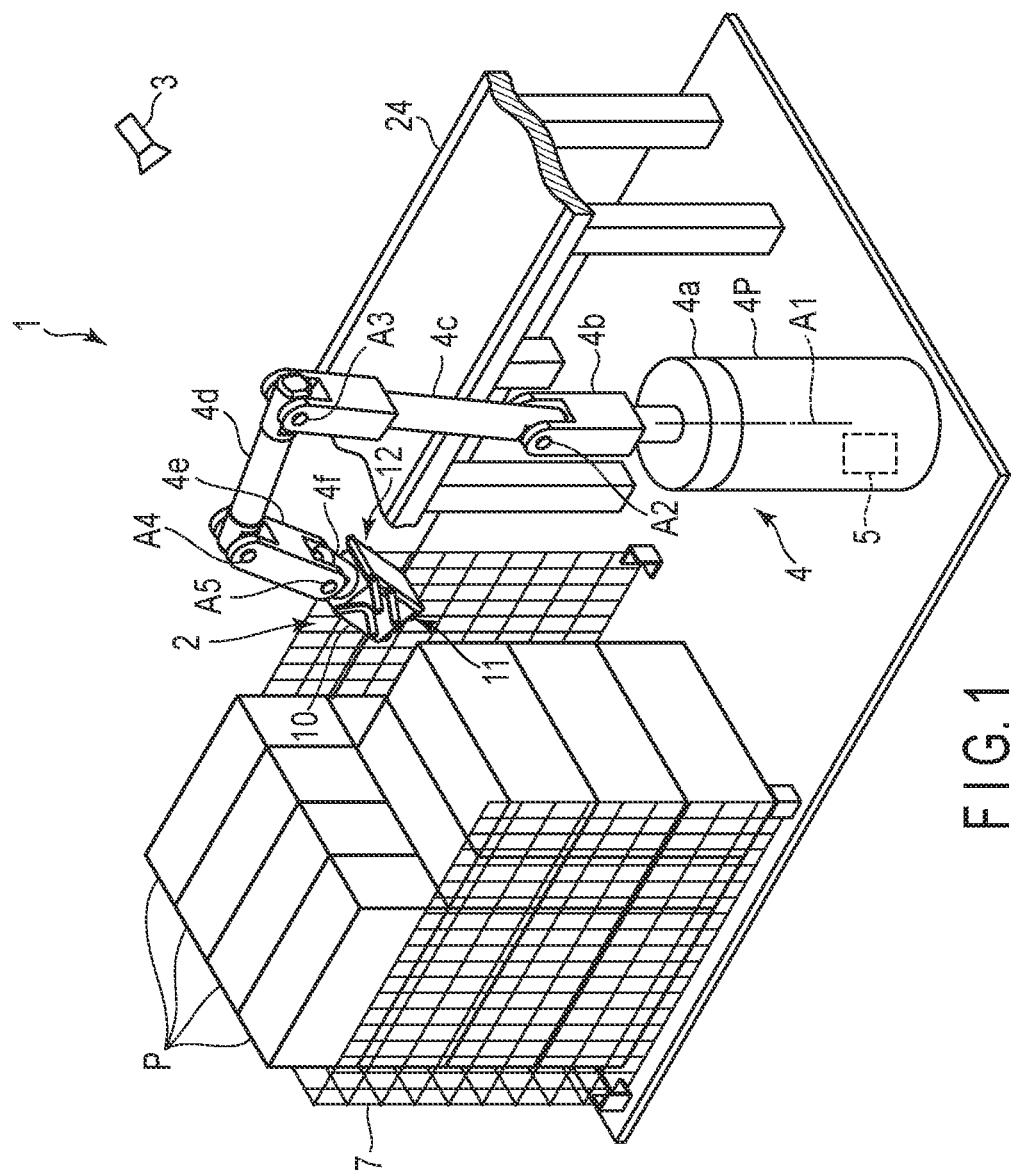
F I G. 1

US 11,420,339 B2

ARTICLE HOLDING DEVICE AND ARTICLE HOLDING SYSTEM

CROSS-REFERENCE TO RELATED APPLICATIONS

This application is a Continuation Application of PCT Application No. PCT/JP2018/033675, filed Sep. 11, 2018 and based upon and claiming the benefit of priority from Japanese Patent Application No. 2017-246761, filed Dec. 22, 2017, the entire contents of all of which are incorporated herein by reference.

FIELD

Embodiments described herein relate generally to a holding technology for holding an article which is the object to be held.

BACKGROUND

Currently, for example, in the lines of distribution warehouses and plants, various types of jobs such as picking up or sorting and transfer of various articles are carried out by an article holding device attached to the distal end of a robot arm instead of manpower. In this case, the article holding device comprises an adsorption mechanism which adsorbs an article and can support the article, and a sandwiching mechanism which sandwiches the adsorbed article from both sides and can support the article. In this structure, the sandwiching mechanism comprises a plurality of sandwiching arms comprising a sandwiching function. Each of the sandwiching arms has an outline shape similar to a finger (nail) of a human.

In the above sandwiching arms, as a contact area with respect to an article is small (in other words, there is a limit to an increase in a contact area), it may be difficult to stably support the article depending on the type of the article (for example, the outline shape and weight). In this case, the contact area of each sandwiching arm with respect to the article could be increased. However, if the contact area is increased, the sandwiching arm itself is upsized and becomes heavy. As a result, it may be difficult to maintain constant followingness and responsiveness for sandwiching operation.

BRIEF DESCRIPTION OF THE DRAWINGS

FIG. 1 is a perspective view showing a specification (upper-surface adsorption holding) state of an article holding system according to an embodiment.

DETAILED DESCRIPTION

Embodiments provide a holding technology whereby an article which is the object to be held can be stably held by increasing a contact area with respect to the article.

In general, according to one embodiment, a holding main body, an adsorption mechanism and a sandwiching mechanism are provided. The sandwiching mechanism comprises a sandwiching arm which comes into contact with one side of an article, and a board-like sandwiching plate which comes into planar contact with the other side of the article.

Hereinafter, this specification explains an article holding system according to an embodiment of the present invention.

Figure 2:
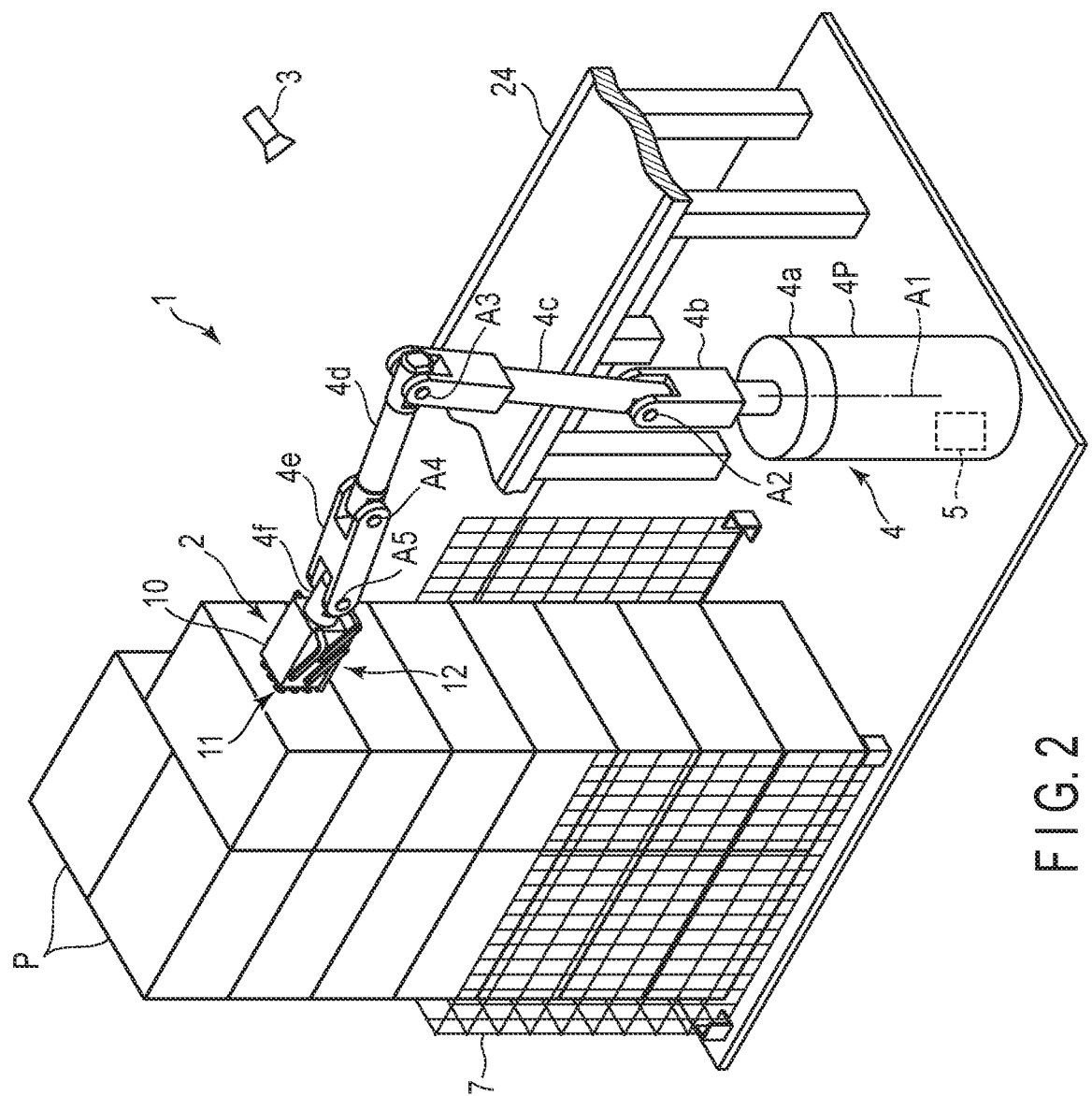
FIG. 2 is a perspective view showing a specification state (side-surface adsorption holding) of the article holding system according to the embodiment.

FIG. 1 and FIG. 2 show an article holding system 1 for carrying out various types of jobs such as picking up or sorting and transfer of a wide variety of articles P (for example, unloading, loading and picking). The article holding system 1 comprises an article holding device 2, an article detection device 3, a robot arm 4 and a control device 5.

The article holding device 2 is configured to hold an article P. The details of the article holding device 2 are explained later. The control device 5 prepares an operation plan based on data obtained from various sensors described later, and performs control based on the operation plan. For example, various sensors 13a, 19a, 19b, 20 and 23, drive shafts 17a, 17b and 21, servomotors 18a, 18b and 22, a controller 9, a recognition portion 8, the article detection device 3, a valve 13b, a compressor 13c and a vacuum generator 13d are controlled. The control device 5 is provided inside an arm supporting stand 4p which supports the robot arm 4.

The article detection device 3 is configured to detect a wide variety of articles P accumulated in an accumulation area. In FIG. 1 and FIG. 2, as an example, articles P having a rectangular outline are shown. However, the articles are not limited to this example. The articles include articles P having various outline shapes such as, as shown in, for example, FIG. 6, a spherical shape, a polygonal shape or an irregular three-dimensional shape in which both sides are curved.

As the accumulation state of articles P in the accumulation area, in FIG. 1 and FIG. 2, a plurality of articles P are orderly stacked. However, the accumulation state is not limited to this example. For example, articles P may be randomly stacked. When articles P are randomly stacked, the holding direction for each article P is not limited to an upper direction (perpendicular direction) or a lateral direction (horizontal direction). A specification for holding an article in an oblique direction is also considered.

As the structure of the accumulation area, in FIG. 1 and FIG. 2, an article container 7 is shown. However, the structure is not limited to this example. For example, a desk, a conveyor belt or shelf may be provided in the accumulation area. In the accumulation area, a plurality of articles P may be accumulated, or a single article P may be placed.

For the article detection device 3, for example, a commercially available RGB camera may be applied. The RGB camera comprises three independent CCD sensors, and is configured to separately record the color signals of three colors (red, green and blue). In this way, the state of the articles P accumulated in the accumulation area (for example, the shape, size, position, posture and distance from a 3D camera to each article P) can be detected with high accuracy.

For the article detection device 3, other than the above RGB camera, for example, a 3D camera and other optical sensors may be applied. When a 3D camera is applied, it is possible to separate various articles P and recognize the shape, position and posture of each of the separated articles P and the distance from the 3D camera to each article P by processing the obtained point cloud data.

Various types of information (for example, the result of detection such as the state of each article P described above) detected by the article detection device 3 undergo image processing in the recognition portion 8 and are transmitted to the control device 5 described later. In this case, for the recognition portion 8, for example, a commercially available computer may be applied. The control device 5 controls the operation of the article holding device 2 and the robot arm 4 described later based on the information (for example, the state of each article P) obtained via the recognition portion 8.

The article detection device 3 should be preferably provided such that the entire part or a part of the articles P in the accumulation area is captured within the field of view. In this case, the article detection device 3 may be provided in, for example, the above article container 7, the article holding device 2 or the robot arm 4 described later, or the building in which the article holding system 1 is constructed.

The robot arm 4 comprises an attachment unit 4f to which the article holding device 2 is allowed to be attached. The robot arm 4 is controlled by the controller 9 (control device 5). In the figures, as an example of the robot arm 4, a 6-axis robot comprising first to sixth axes constructed on the arm supporting stand 4p is shown. The details of the attachment unit 4f are described later.

In this case, the controller 9 controls the rotation of each axis of the robot arm (6-axis robot) 4 and transfers and rotates the attachment unit 4f in an arbitrary direction based on the result of detection (various information) of the above article detection device 3. In this way, for example, the position and posture of the article holding device 2 attached to the attachment unit 4f and the distance from the 3D camera to each article P are controlled. As a result, the article holding device 2 is allowed to approach or move away from each article P.

Thus, with respect to each article P accumulated in the accumulation area, controls for causing the article holding device 2 to approach and hold each article P from the upper side (perpendicular direction) as shown in FIG. 1 can be performed, or controls for causing the article holding device 2 to approach and hold each article P from a lateral side (horizontal direction) as shown in FIG. 2 can be performed.

Figure 4:
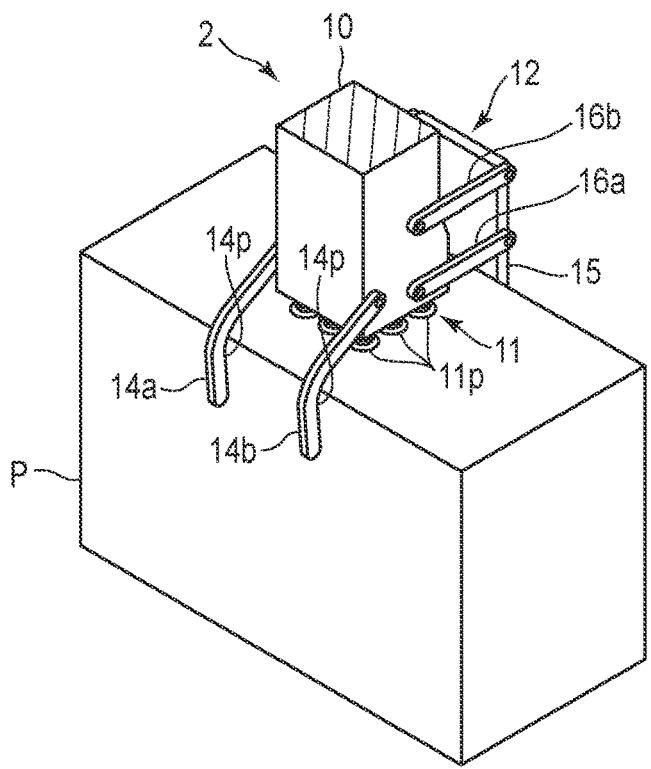
FIG. 4 is a perspective view of the article holding device in an upper-surface adsorption holding state.
Figure 5:
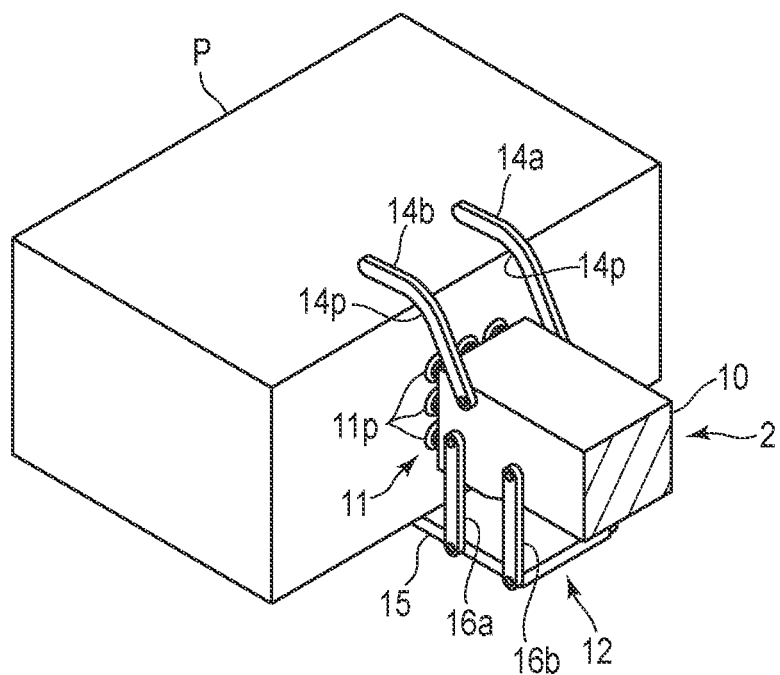
FIG. 5 is a perspective view of the article holding device in a side-surface adsorption holding state.
Figure 6:
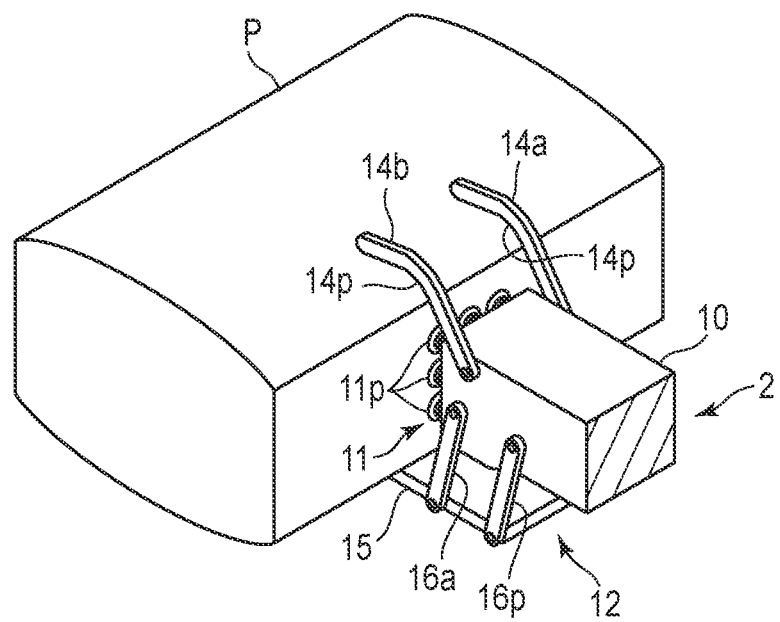
FIG. 6 is a perspective view showing the holding state of an article having the outline of a curved surface.
Figure 7:
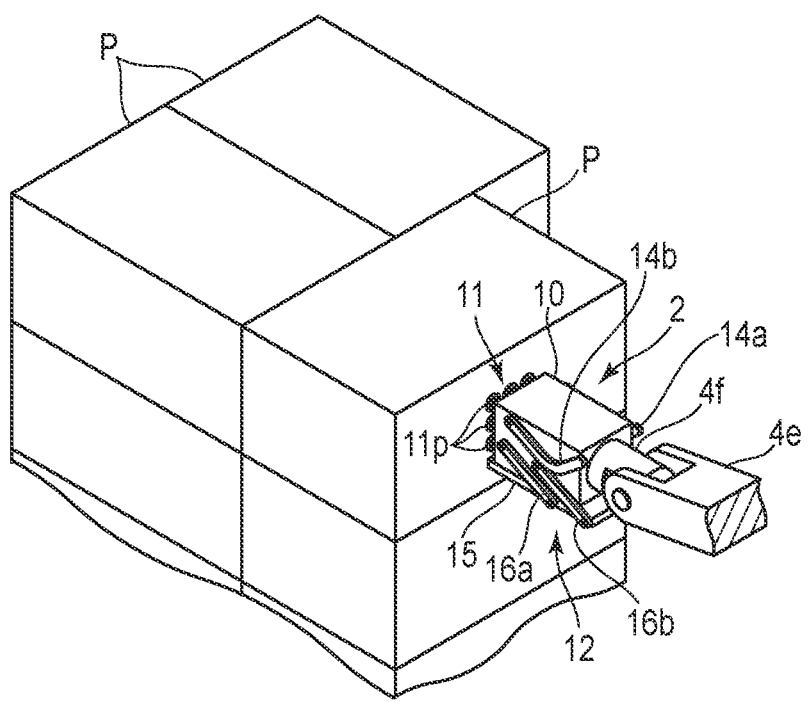
FIG. 7 is a perspective view showing an adsorption process.

For example, FIG. 4 shows a state in which an article P is held from the upper side (perpendicular direction) by the article holding device 2 (an adsorption mechanism 11 and a sandwiching mechanism 12) described later. FIG. 5 shows a state in which an article P is held from a lateral side (horizontal direction). FIG. 6 shows the holding state of an article P in which the two sides sandwiched by the sandwiching mechanism 12 described later are curved.

As shown in FIG. 1 and FIG. 2, the robot arm (6-axis robot) 4 comprises an arm main body 4b provided in a base 4a and rotatable around the first axis A1, a first relay arm 4c rotatable around the second axis A2 at the distal end of the arm main body 4b, a second relay arm 4d rotatable around the third axis A3 at the distal end of the first relay arm 4c, a third relay arm 4e rotatable around the fourth axis A4 at the distal end of the second relay arm 4d and the attachment unit 4f rotatable around the fifth axis A5 at the distal end of the third relay arm 4e. The attachment unit 4f is configured to rotate the article holding device 2 attached hereto around its sixth axis (not shown).

The robot arm 4 is not limited to the above 6-axis robot described above. For example, a 7-axis or 5- or less-axis robot, a SCARA robot or an XYZ stage may be applied. In FIG. 1 and FIG. 2, as an example, the robot arm 4 is secured to a certain position. However, the structure is not limited to this example. For example, the robot arm 4 may be placed in a linear stage or an automated carriage so as to be movable.

As shown in FIG. 1 to FIG. 6, the article holding device 2 comprises a holding main body 10, the adsorption mechanism 11 and the sandwiching mechanism 12, and is configured to hold an article P which is the object to be held by adsorbing and sandwiching the article P by these elements.

For example, various drive shafts 17a, 17b and 21 described later and a drive force transfer mechanism (not shown) which transfers the drive force of the servomotors 18a, 18b and 22 described later to the drive shafts 17a, 17b and 21 are incorporated into the holding main body 10.

In FIG. 1 to FIG. 6, as an example, the rectangular parallelepiped holding main body 10 is shown. However, the shape is not limited to this example. For example, a shape based on the use environment and purpose, such as a polygonal shape other than a rectangular parallelepiped shape or an oval shape, may be applied.

Figure 13:
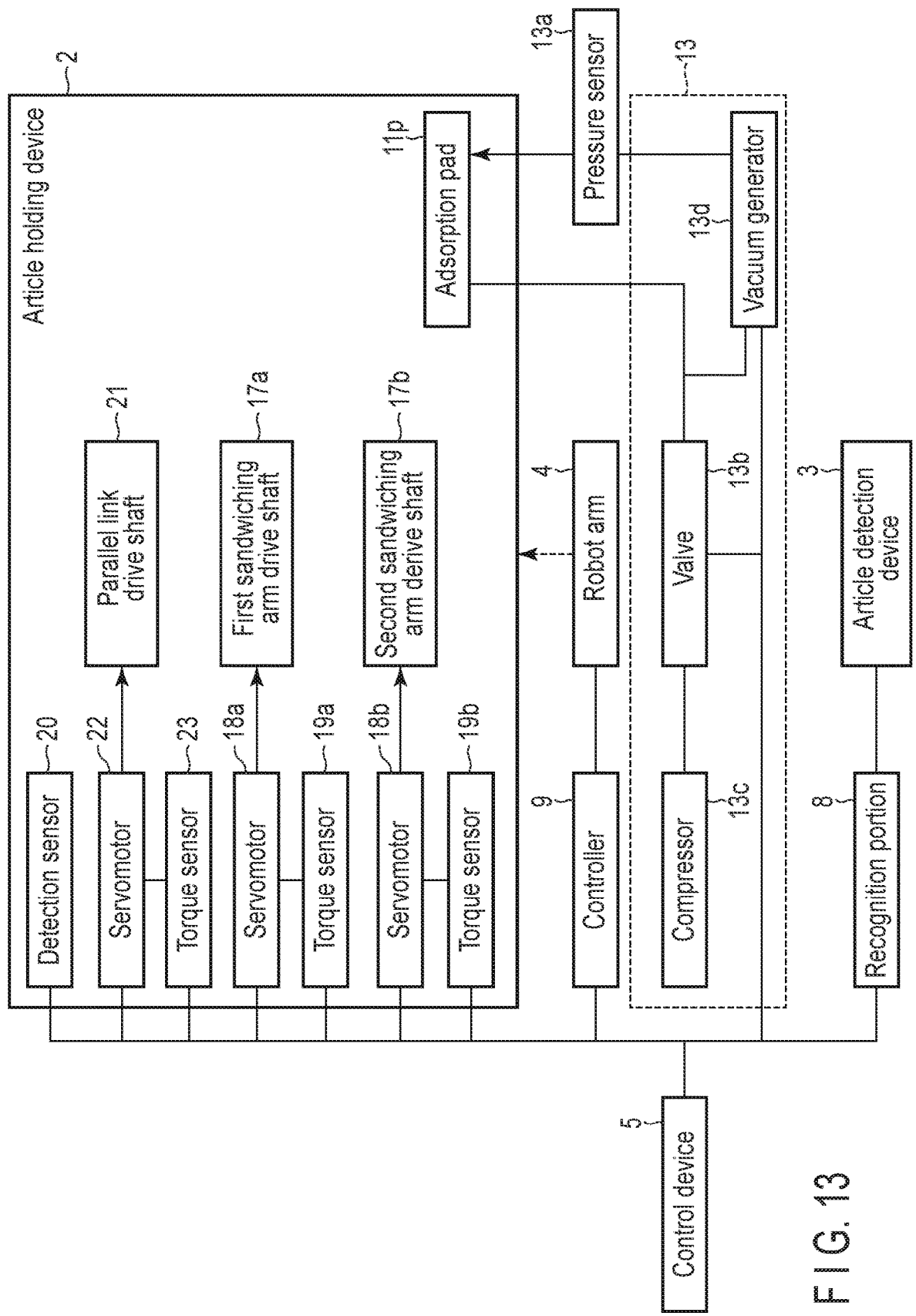
FIG. 13 is a block diagram of a control circuit applied to the article holding system.

The adsorption mechanism 11 is configured to adsorb an article P which is the object to be held. The adsorption mechanism 11 comprises a plurality of adsorption pads 11p which are adsorbed to a plurality of positions of an article P. Each absorption pad 11p is connected by piping to the vacuum system 13 shown in FIG. 13 via an air tube (not shown). As an example of the vacuum system, FIG. 13 shows the pressure sensor 13a, the valve 13b, the compressor 13c and the vacuum generator 13d. The vacuum generator 13d is connected to each adsorption pad 11p via the pressure sensor 13a. Further, the compressor 13c is connected to each adsorption pad 11p via the valve 13b. For example, the valve 13b is configured to switch in three stages (first to third states).

In this structure, in the first state of the valve 13b, compressed air is supplied from the compressor 13c to the vacuum generator 13d. In this way, an article P which comes into contact with the adsorption mechanism 11 (adsorption pads 11p) can be adsorbed to the adsorption mechanism 11 (adsorption pads 11p) by a negative pressure.

In the second state of the valve 13b, compressed air is directly supplied from the compressor 13c to the adsorption pads 11p. In this way, the vacuum of the adsorption pads 11p is broken, thereby becoming barometric pressure. Thus, an article P can be released from the adsorption mechanism 11 (adsorption pads 11p).

In the third state of the valve 13b, the compressor 13c is closed. In this way, the supply of compressed air is stopped. At the time of the above switching operation of the valve 13b and the on/off operation of the vacuum generator 13d, the air pressure inside the adsorption pads 11p is measured by the pressure sensor 13a. The result of measurement is fed back to the control device 5.

Figure 3:
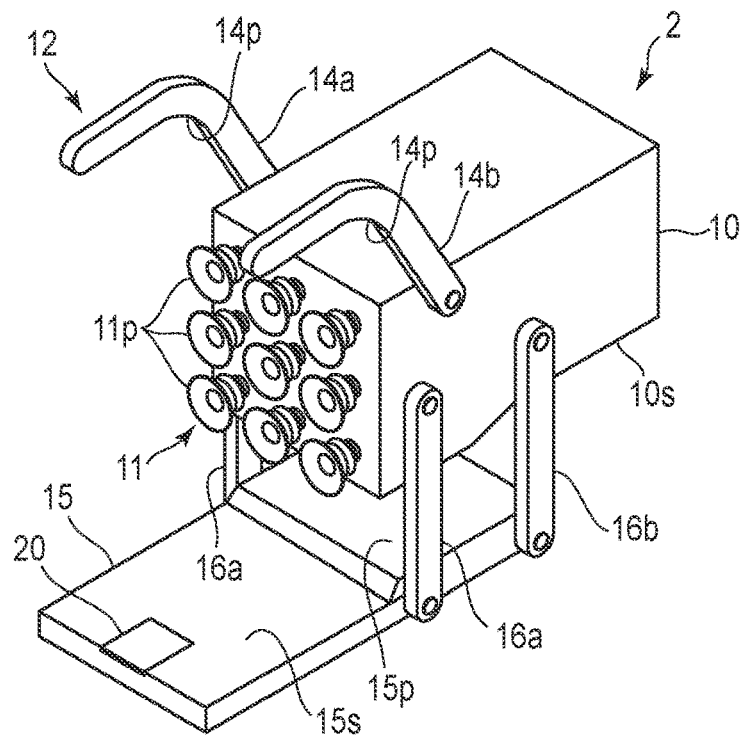
FIG. 3 is a perspective view of an article holding device applied to the article holding system.

In FIG. 3, as an example, nine adsorption pads 11p are vertically and horizontally arranged in a lattice shape at regular intervals such that each line has three adsorption pads 11p. Each adsorption pad 11p should be preferably formed of, for example, a material having less rigidity such as silicone rubber. In this structure, each adsorption pad 11p is allowed to be deformed along the surface shape of each article P, and is also allowed to secure a certain strength for a shearing force and a moment force.

The number of adsorption pads 11p, their sizes and arrangement are set based on, for example, the use environment and purpose of the article holding system 1 (article holding device 2). Thus, they are not particularly limited here. For example, if an article P is small, only one adsorption pad 11p may be provided. The arrangement of the adsorption pads 11p is not limited to the lattice shape shown in the figure. The adsorption pads 11p may be arranged in a staggered shape or a radial shape. Further, instead of the adsorption pads 11p, sponge pads may be applied.

The sandwiching mechanism 12 is provided on both sides so as to sandwich the above adsorption mechanism 11, and is configured to support an adsorbed article P by sandwiching it from both sides (one side and the other side). To realize this structure, the sandwiching mechanism 12 comprises sandwiching arms 14a and 14b, a sandwiching plate 15 and a link mechanism 16. One side and the other side of an article P have a locational relationship facing each other. The other side is defined on a side opposite to one side.

As shown in FIG. 3 to FIG. 6, a plurality of sandwiching arms 14a and 14b may be provided for the holding main body 10. In FIG. 3 to FIG. 6, as an example, two sandwiching arms (the first sandwiching arm 14a and the second sandwiching arm 14b) are rotatably supported in the holding main body 10. The sandwiching arms 14a and 14b are structured such that their proximal ends (in other words, arm rotation portions) are rotatably connected to the holding main body 10, and such that the distal end sides (in other words, arm portions) are allowed to be in contact with one side of an article P. In this case, the sandwiching arms 14a and 14b should be preferably structured by an elastic member such as urethane rubber or silicone rubber.

The proximal end (arm rotation portion) of the first sandwiching arm 14a is connected to the first sandwiching arm drive axis 17a (see FIG. 13) incorporated into the holding main body 10. The first sandwiching arm drive shaft 17a is controlled by the servomotor 18a with regard to rotation. In this case, at the time of rotation control by the servomotor 18a, the torque applied to the first sandwiching arm drive shaft 17a is detected by the torque sensor 19a. At this time, the result of detection output from the torque sensor 19a is fed back to the control device 5. In this way, the distal end of the first sandwiching arm 14a is allowed to come into contact with one side of an article P with an optimum pressure.

The proximal end (arm rotation portion) of the second sandwiching arm 14b is connected to the second sandwiching arm drive shaft 17b (see FIG. 13) incorporated into the holding main body 10. The second sandwiching arm drive shaft 17b is controlled by the servomotor 18b with regard to rotation. In this case, at the time of rotation control by the servomotor 18b, the torque applied to the second sandwiching arm drive shaft 17b is detected by the torque sensor 19b. At this time, the result of detection output from the torque sensor 19b is fed back to the control device 5. In this way, the distal end of the second sandwiching arm 14b is allowed to come into contact with one side of an article P with an optimum pressure.

Further, both of the sandwiching arms 14a and 14b (arm portions) have a shape curved along a direction avoiding the corner portion of an article P. In other words, the sandwiching arms 14a and 14b comprise a curved portion 14p curved in a direction off the straight line connecting the distal end and the proximal end. This curved shape is merely an example. The sandwiching arms 14a and 14b may be changed to an arbitrary shape (for example, a rectangle, triangle or circle) depending on the shape and size of an article P which is the object to be held.

In this case, in the process of holding an article between the sandwiching arms 14a and 14b and the sandwiching plate 15 described later, the curved portion 14p is located so as to be curved in a direction moving away from the sandwiching plate 15 (specifically, a contact plane 15s as described later) when the article P is held. In this way, the sandwiching arms 14a and 14b are allowed to come into contact with one side of the article P while the curved portion 14p does not interfere with (come into contact with) the corner portion of the article P.

The above servomotors 18a and 18b are allowed to detect the state of rotation (for example, the amount of rotation and the rotation speed) with high accuracy in real time by their encoders. In this case, two sandwiching arms 14a and 14b are allowed to rotate at the same time point or different time points when the servomotors 18a and 18b, the torque sensors 19a and 19b and the control device 5 cooperate with each other. In this way, the contact pressure of the sandwiching arms 14a and 14b with regard to a wide variety of articles P can be accurately controlled.

As shown in FIG. 3 to FIG. 6, the sandwiching plate 15 is rotatably supported in the holding main body 10, and is configured to come into planar contact with the other side of an article P. In this case, the sandwiching plate 15 comprises, for example, a plate portion and a plate rotation portion. The plate portion comes into planar contact with the other side surface) of the holding main body 10 and the second surface of the plate portion (sandwiching plate 15) facing the bottom surface (first surface) comprises a step. In this case, a step surface 10s becoming hollow in a rectangular shape as compared with the other portions is structured on the bottom surface (first surface) of the holding main body 10. On the second surface of the plate portion (sandwiching plate 15), a step surface 15p and the contact plane 15s described later are structured. The step surface 15p and the contact plate 15s are structured so as to have a difference in height to fit in the bottom shape (step shape) of the holding main body 10 comprising the step surface 10s. The step surface 15p is structured so as to protrude in a rectangular shape from the contact plane 15s. The step surface 15p is structured such that the link mechanism 16 (the drive link portion 16a and the following link portion 16b) are rotatably connected.

As an example, FIG. 3 shows the sandwiching plate 15 comprising the flat contact plane 15s and the flat step surface 15p. However, the structure is not limited to this example. For example, an irregular shape may be applied to a part of or the entire part of the contact plane 15s described later. By applying an irregular shape, the sandwiching performance or sandwiching stability of the contact plane 15s can be further improved.

The sandwiching plate 15 comprises the contact plane 15s and the detection sensor 20. The contact plane 15s is configured to come into planar contact with the surface of the other side of an article P in parallel with the surface of the other side of the article P. The detection sensor 20 is provided on the contact plane 15s, and is configured to detect the contact state between the contact plane 15s and the surface of the other side of the article P.

For the detection sensor 20, for example, a commercially available contact sensor or optical sensor may be separately applied, or both of the sensors may be applied in combination. A contact sensor detects the contact of an article P with regard to the contact plane 15s. An optical sensor detects the contact of an article P with regard to the contact plane 15s by optically measuring the distance between the article P and the contact plane 15s.

For the outline shape of the sandwiching plate 15, instead of a rectangular board-like shape, for example, an outline shape based on the use environment and purpose, such as an elliptic shape and a polygonal shape, may be applied. In this case, even if any outline shape is applied, the sandwiching plate 15 is rotatably supported in the holding main body 10 by the link mechanism 16 described later.

As shown in FIG. 3 to FIG. 6, the plate rotation portion, in other words, the link mechanism 16, is structured on the both sides of the above sandwiching plate 15 so as to sandwich the step surface 15p such that a pair of link portions (the drive link portion 16a and the following link portion 16b) is provided parallel to each other. The link portions 16a and 16b have the same outline and the same length. In FIG. 3 to FIG. 6, as an example, the link portions 16a and 16b have a bar-shaped outline extending straight. An end is rotatably connected to the sandwiching plate 15. The other end is rotatably connected to the holding main body 10.

Further, a single parallel link mechanism is structured in each of the two sides of the sandwiching plate 15. The parallel link mechanism includes the holding main body 10, the sandwiching plate 15 and a pair of link portions 16a and 16b. In this way, the sandwiching plate 15 is allowed to rotate toward the surface of the other side of an article P while maintaining the locational relationship parallel to the surface of the other side of the article P.

In a pair of link portions 16a and 16b, the other end of one link portion (in other words, the drive link portion 16a) is connected to the parallel link drive shaft 21 (see FIG. 13) incorporated into the holding main body 10, and the parallel link drive shaft 21 is controlled by the servomotor 22 with regard to rotation. In a pair of link portions 16a and 16b, the other end of the other link portion (in other words, the following link portion 16b) is rotatably supported in the holding main body 10.

In this case, at the time of rotation control by the servomotor 22, the torque applied to the parallel link drive shaft 21 is detected by the torque sensor 23. At this time, the result of detection output from the torque sensor 23 is fed back to the control device 5. In this way, the drive link portion 16a rotates around its other end. By following this rotation, the sandwiching plate 15 and the following link portion 16b rotate. As a result, the sandwiching plate 15 (contact plane 15s) is allowed to approach the surface of the other side of an article P in parallel.

The above servomotor 22 is allowed to detect the state of rotation (for example, the amount of rotation and the rotation speed) with high accuracy in real time by its encoder. In this case, the above sandwiching plate 15 is allowed to rotate at an optimum time point when the servomotor 22, the torque sensor 23 and the control device 5 cooperate with each other. In this way, the contact pressure of the sandwiching plate 15 (contact plane 15s) with regard to a wide variety of articles P can be accurately controlled.

Now, this specification explains the main operation of the article holding system 1 with reference to FIG. 14 to FIG. 17.

Figure 14:
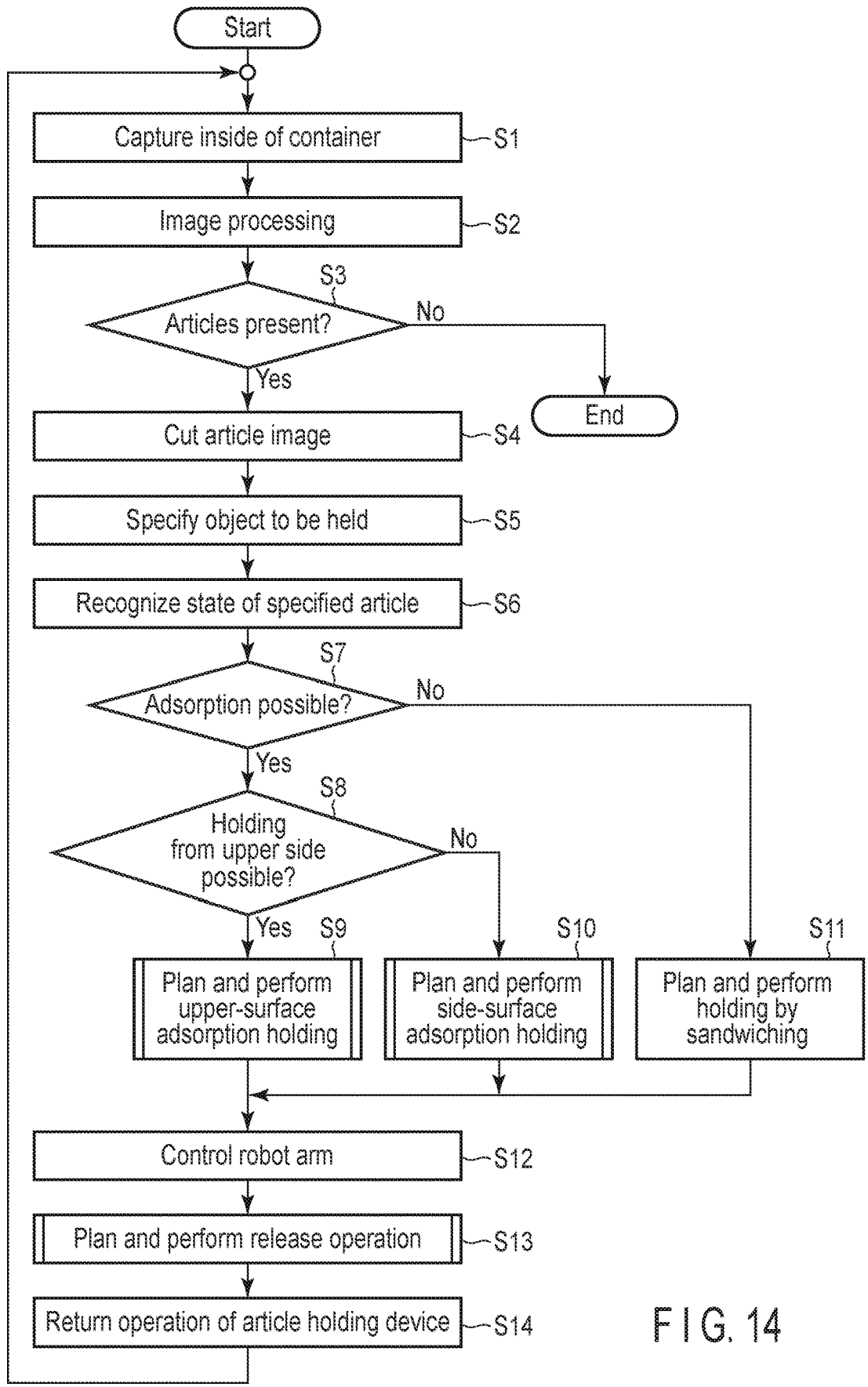
FIG. 14 is a flowchart showing the operation of the article holding system.

The inside of the article container 7 provided in the accumulation area is captured by the article detection device 3 (S1 in FIG. 14). At this time, image data is output from the article detection device 3, and the recognition portion 8 applies image processing to the image data (S2 in FIG. 14). In this way, for example, the presence or absence of an article P inside the article container 7 and the state of accommodation of articles P (the stacked form or angle) are detected.

When no article P is present inside the article container 7 (S3 in FIG. 14), the control device 5 finishes image processing based on an output signal from the recognition portion 8.

When articles P are present inside the article container 7 (S3 in FIG. 14), the recognition portion 8 separately cuts the articles P included in the image data (S4 in FIG. 14) and selects one of the cut articles P based on the criterion set in advance (S5 in FIG. 14). Thus, the object to be held is specified.

The criterion set in advance is not particularly limited. For example, as the criterion, the object provided at the highest position, the object located in front of the robot arm 4, an object having a sufficient gap with the other articles P, an object close to the center of the article container 7 or an object defined in advance on database such that it is easily held is assumed.

Subsequently, image processing is applied again in the recognition portion 8, thereby recognizing the state of the specified article P (the object to be held) (S6 in FIG. 14). As the state of the article, for example, the shape, size, position and posture of the article P and the distance from the 3D camera to the article P are assumed.

At this time, the recognition portion 8 transmits data related to the state of the specified article P to the control device 5. The control device 5 plans the operation of the robot arm 4 and the article holding device 2 based on the data and performs control.

Firstly, whether or not the specified article P can be adsorbed is determined based on the determination criterion set in advance (S7 in FIG. 14). As the determination criterion, for example, the degree of unevenness of the surface of the article or the curvature is assumed. As an example of the determination method, when a plane which can be adsorbed to all the adsorption pads 11p is present on the upper surface or a side surface of the article P, it is determined that the article P can be adsorbed. When a plane is not present, it is determined that the article P cannot be adsorbed.

Subsequently, the control device 5 determines whether or not the specified article P can be adsorbed and held from the upper side (perpendicular direction) of the article P (S8 in FIG. 14). At this time, when a surface which can be adsorbed is present on the upper side (perpendicular direction) as shown in FIG. 1, the control device 5 plans and performs controls for adsorbing and holding the article P from the upper surface (S9 in FIG. 14).

When a surface which can be adsorbed in the specified article P is present on a lateral side (horizontal direction) as shown in FIG. 2, the control device 5 plans and performs controls for adsorbing and holding the article P from the lateral side (S10 in FIG. 14). The operation of processes S9 to S10 (operation for adsorbing and holding the upper surface and operation for adsorbing and holding a side surface) is described later with reference to FIG. 15 and FIG. 16.

When the specified article P has a shape which cannot be adsorbed, for example, the control device 5 plans and performs controls for holding the article P by sandwiching the article P without performing adsorption operation (S11 in FIG. 14).

Subsequently, to perform the operation of processes S9 to S11, the control device 5 performs the control of the robot arm 4 (S12 in FIG. 14). In this operation, the article P held by the article holding device 2 is transferred from the article container 7 to a belt conveyor 24 while following the operation of the robot arm 4 as shown in, for example, FIG. 1 and FIG. 2.

At this time, the control device 5 plans and performs controls for releasing the article P to the belt conveyor 24 (S13 in FIG. 14). The release operation of process S13 is described later (see FIG. 17).

After the completion of the release operation, the control device 5 causes the article holding device 2 to return to the initial state (S14 in FIG. 14). For the initial state, for example, as shown in FIG. 1, FIG. 2, FIG. 7 and FIG. 8, a state in which the sandwiching arms 14a and 14b and the sandwiching plate 15 are stored along the holding main body 10 is assumed.

By repeating the above processes S1 to S14, all the articles P accommodated in the article container 7 are transferred to the belt conveyor 24.

The operation for adsorbing and holding the upper surface is explained with reference to FIG. 15.

Figure 15:
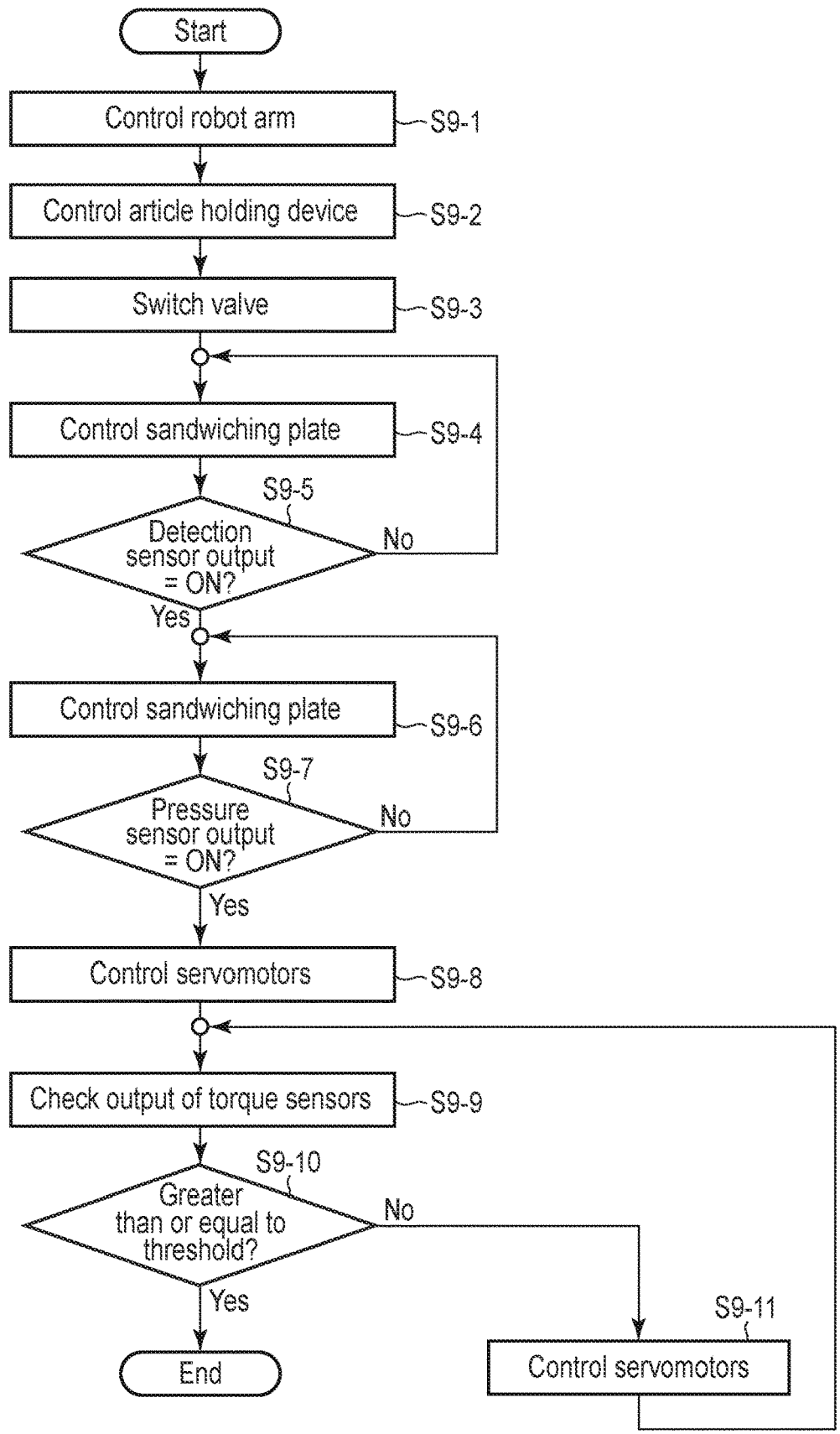
FIG. 15 is a flowchart for performing upper-surface adsorption holding.

Firstly, the control device 5 controls the operation of the robot arm 4 (S9-1 in FIG. 15). At this time, as shown in FIG. 1, controls for causing the article holding device 2 to approach and hold each article P provided inside the article container 7 from the upper side (perpendicular direction) are performed.

Subsequently, the control device 5 controls the article holding device 2 so as to be in the holding waiting posture as shown in FIG. 3 (S9-2 in S15). For example, by driving the servomotor 22, the parallel link mechanism (the holding main body 10, the sandwiching plate 15, a pair of link portions 16a and 16b) and two sandwiching arms 14a and 14b are displaced.

In FIG. 3, as an example, a pair of link portions 16a and 16b is developed to the lower side in a perpendicular direction, and both of the sandwiching arms 14a and 14b are developed to the upper side in a perpendicular direction. In this way, the article holding device 2 (in other words, the adsorption mechanism 11) is allowed to approach the specified article P (the object to be held) and adsorb the article P without coming into contact with the article container 7 or the other articles P.

In a state where the adsorption mechanism 11 (in other words, the adsorption pads 11p) is in contact with the specified article P, the control device 5 switches the valve 13b of the vacuum system 13 of FIG. 13 to the first state (S9-3 in FIG. 15). In the first state of the valve, compressed air is supplied from the compressor 13c to the vacuum generator 13d. At this time, a negative pressure is applied to the adsorption pads 11p. As a result, the upper surface of the article can be adsorbed to the adsorption pads 11p.

Subsequently, the control device 5 controls the operation of the robot arm 4 so as to cause the sandwiching plate 15 (in other words, the contact plane 15s) to approach the specified article P while monitoring the output of the above detection sensor 20 (S9-4 in FIG. 15). When the output of the detection sensor 20 is in an on-state (contact state) (S9-5 in FIG. 15), the operation of the robot arm 4 is stopped.

Subsequently, the control device 5 controls the operation of the robot arm 4 so as to cause the adsorption mechanism 11 (in other words, the adsorption pads 11p) to come into contact with the specified article P while monitoring the output of the pressure sensor 13a of the vacuum system 13 of FIG. 13 (S9-6 in FIG. 15).

When the output of the pressure sensor 13a is in an on-state (contact state) in a state where the adsorption pads 11p are in contact with the article P (S9-7 in FIG. 15), the control device 5 determines that the specified article P is adsorbed to the adsorption pads 11p by an optimum pressure (adsorption pressure).

In a state where the specified article P is adsorbed to the adsorption pads 11p, further, the control device 5 controls the servomotors 18a, 18b and 22 and operates various drive shafts 17a, 17b and 21 (S9-8 in FIG. 15). In this way, both sides of the specified article P are sandwiched by the sandwiching mechanism 12 (the sandwiching arms 14a and 14b and the sandwiching plate 15).

At this time, the control device 5 checks the output of the torque sensors 19a, 19b and 23 (S9-9 in FIG. 15) and controls the servomotors 18a, 18b and 22 until the output value exceeds a threshold set in advance (S9-10 to S9-11 in FIG. 15). When the article P is deformed depending on the degree of sandwiching force, the servomotors 18a, 18b and 22 are reversely rotated. When the output value reaches the threshold set in advance, it is determined that sandwiching is completed.

Now, this specification explains the operation for adsorbing and holding a side surface with reference to FIG. 7 to FIG. 10 and FIG. 16.

Figure 16:
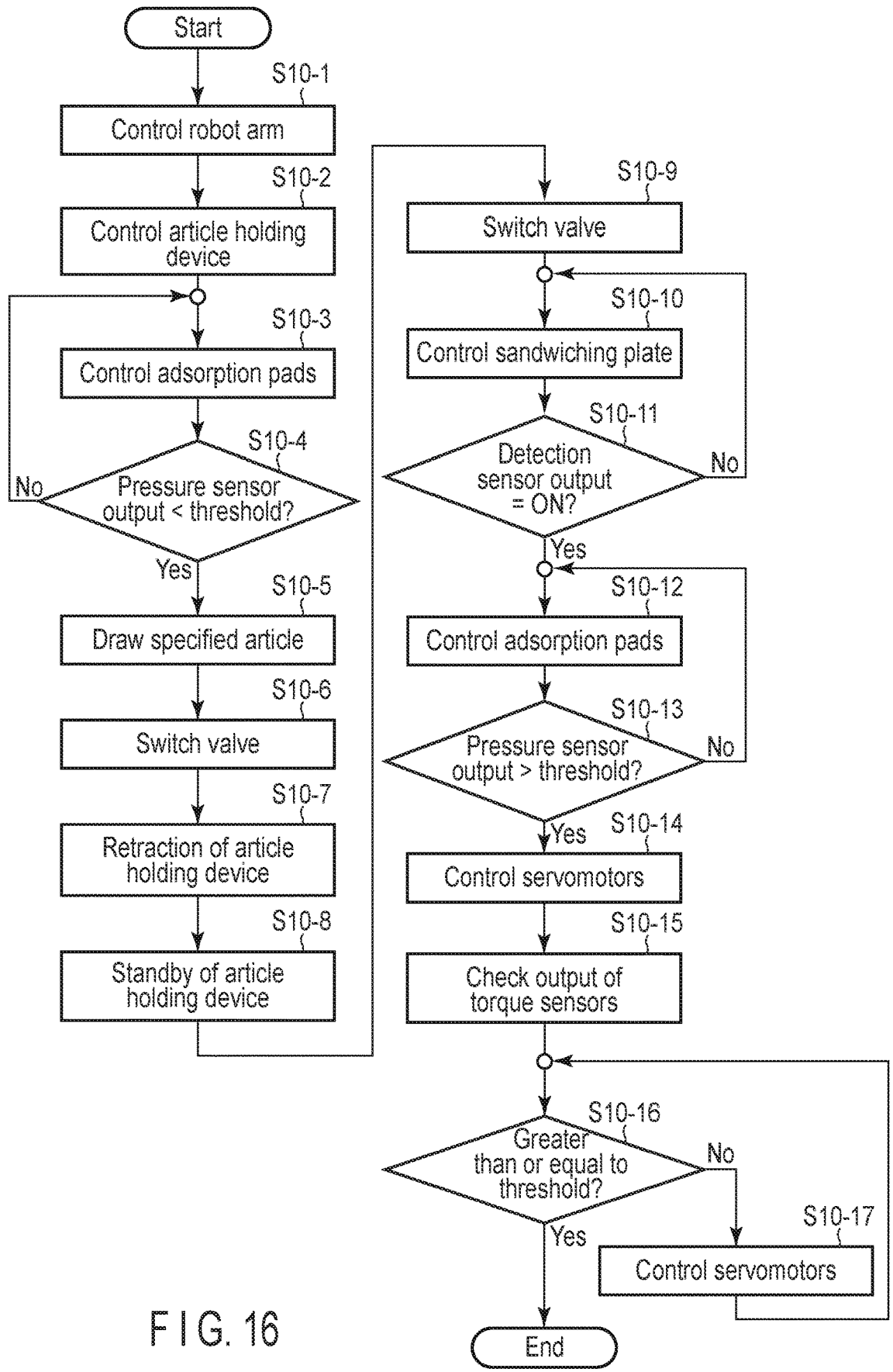
FIG. 16 is a flowchart for performing side-surface adsorption holding.

Firstly, the control device 5 controls the operation of the robot arm 4 (S10-1 in FIG. 16). At this time, as shown in FIG. 2, controls for causing the article holding device 2 to approach and hold each article P provided inside the article container 7 from a lateral side (horizontal direction) are performed. In this period, the article holding device 2 is maintained so as to be in the initial state as shown in, for example, FIG. 1, FIG. 2, FIG. 7 and FIG. 8.

Subsequently, the control device 5 causes the article holding device 2 (in other words, the adsorption mechanism 11) to approach a side surface (see FIG. 7) of the specified article P (the object to be held) and adsorb the article P (S10-3 in FIG. 16) while controlling the article holding device 2 so as to be in the initial state (S10-2 in FIG. 16).

When the output of the pressure sensor 13a is less than a threshold set in advance in a state where the adsorption pads 11p are in contact with the article P (S10-4 in FIG. 16), the control device 5 determines that the specified article P is adsorbed to the adsorption pads 11p.

Figure 8:
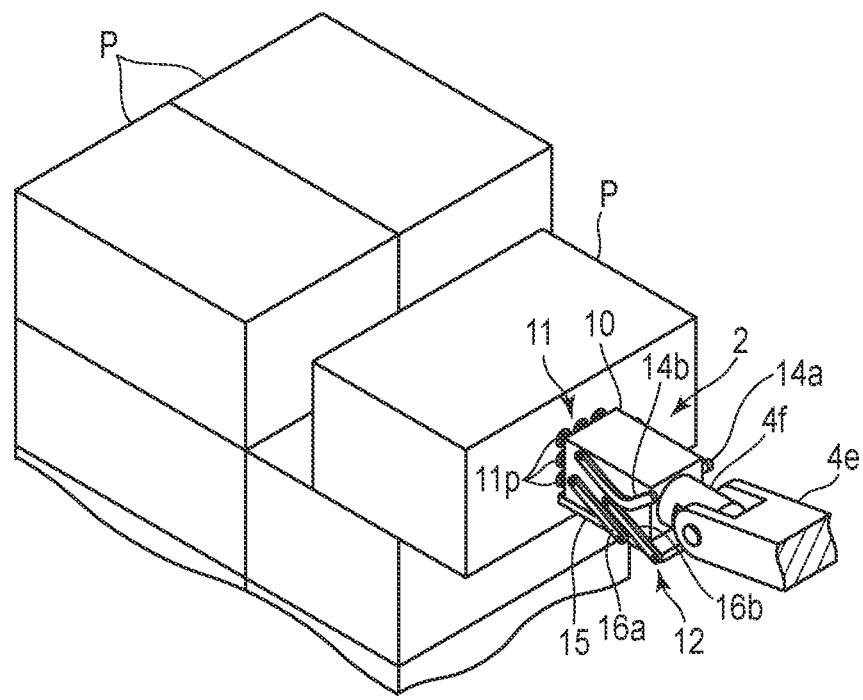
FIG. 8 is a perspective view showing the drawing process of an adsorbed article.
Figure 9:
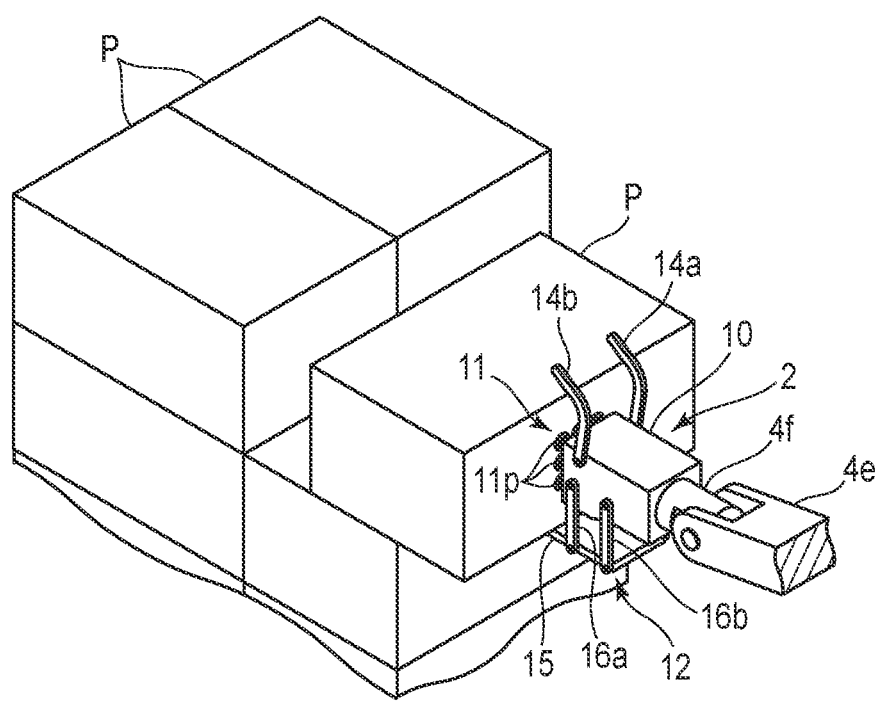
FIG. 9 is a perspective view showing the developing process of a holding mechanism.
Figure 10:
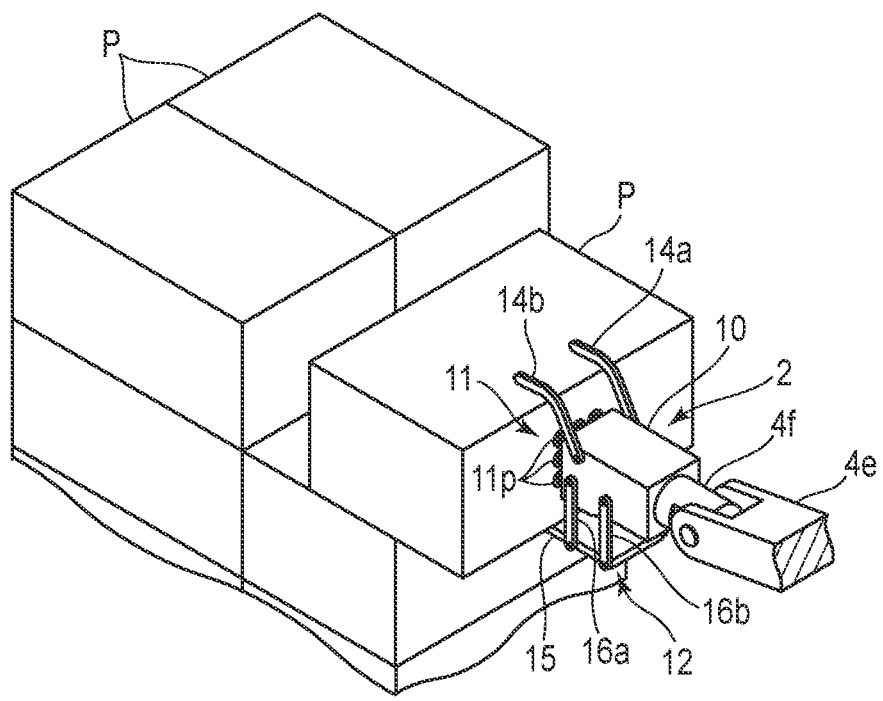
FIG. 10 is a perspective view showing a holding process.

In a state where the specified article P is adsorbed to the adsorption pads 11p, the control device 5 controls the operation of the robot arm 4 so as to draw the article P as shown in FIG. 8 (S10-5 in FIG. 16). To draw the article, for example, a specification for drawing the specified article P toward the robot arm 4 by only a distance set in advance can be assumed. In this case, the drawing distance of the article P is set to an extent that the drawn article P does not fall.

Specifically, in a case where the size or depth of the specified article P is clear when the article P is drawn, setting is performed based on the size and depth. The size and depth of the article P may be obtained from the result of processing in the recognition portion 8, or may be obtained by referring to database in which the information of the article P is registered in advance.

When, for example, the size or depth of the article P is not clear in advance, the article P may fall. In particular, in a state where a plurality of articles P are orderly stacked, the depth of each article P may be difficult to know.

To solve this problem, for example, an article P is firstly drawn by only a short distance. Subsequently, a process for reviewing the article P is performed. In this way, a gap is formed between the articles. Thus, for example, the size and depth of each article P can be accurately recognized. As a result, the article P can be drawn by only a distance set in advance without falling. The distance set in advance may be, for example, a distance equivalent to 30% of the depth of the recognized article P.

In this state, the control device 5 switches the valve 13*b* (see FIG. 13) of the vacuum system 13 to the second state (S10-6 in FIG. 16). In the second state of the valve 13*b*, compressed air is directly supplied from the compressor 13*c* to the adsorption pads 11*p*. At this time, the adsorption pads 11*p* are returned to a barometric pressure state. As a result, the adsorption state of the adsorption pads 11*p* with regard to the article P is cancelled.

Subsequently, the control device 5 controls the operation of the robot arm 4 such that the article holding device 2 moves away (goes back) from the article P (S10-7 in FIG. 16). Subsequently, the control device 5 controls the article holding device 2 so as to be in a holding waiting posture (see FIG. 3) (S10-8 in FIG. 16).

Subsequently, the control device 5 switches the valve 13*b* (see FIG. 13) of the vacuum system 13 to the above first state (S10-9 in FIG. 16). Subsequently, the control device 5 controls the operation of the robot arm 4 so as to cause the sandwiching plate 15 (contact plane 15*s*) to approach the specified article P while monitoring the output of the above detection sensor 20 (S10-10 in FIG. 16). When the output of the detection sensor 20 is in an on-state (contact state) (S10-11 in FIG. 16), the operation of the robot arm 4 is stopped as shown in, for example, FIG. 9.

Subsequently, the control device 5 controls the operation of the robot arm 4 so as to cause the adsorption mechanism 11 (adsorption pads 11*p*) to approach the specified article P while monitoring the output of the pressure sensor 13*a* of the vacuum system 13 of FIG. 13 (S10-12 in FIG. 16).

When the output of the pressure sensor 13*a* exceeds a threshold set in advance in a state where the adsorption pads 11*p* are in contact with the article P (S10-13 in FIG. 16), the control device 5 determines that the specified article P is adsorbed to the adsorption pads 11*p*.

In a state where the specified article P is adsorbed to the adsorption pads 11*p*, the control device 5 controls the servomotors 18*a*, 18*b* and 22 and operates various drive shafts 17*a*, 17*b* and 21 (S10-14 in FIG. 16). In this way, both sides of the specified article P are sandwiched by the sandwiching mechanism 12 (the sandwiching arms 14*a* and 14*b* and the sandwiching plate 15) (see FIG. 10).

At this time, the control device 5 checks the output of the torque sensors 19*a*, 19*b* and 23 (S10-15 in FIG. 16) and controls the servomotors 18*a*, 18*b* and 22 until the output value exceeds a threshold set in advance (S10-16 to S10-17 in FIG. 16). When the article P is deformed depending on the degree of sandwiching force, the servomotors 18*a*, 18*b* and 22 are reversely rotated. When the output value exceeds the threshold set in advance, it is determined that sandwiching is completed.

Now, release operation is explained with reference to FIG. 11, FIG. 12 and FIG. 17.

When either the operation for adsorbing and holding the upper surface or the operation for adsorbing and holding a side surface is applied, the article P is in a state where both sides are sandwiched by the sandwiching mechanism 12 as the portion adsorbed by the adsorption mechanism 11 is sandwiched (in other words, an adsorption holding state). While maintaining the adsorption holding state, for example, as shown in FIG. 11 and FIG. 12, the article P is transferred from the article container 7 to the belt conveyor 24.

The control device 5 plans and performs controls for releasing the article P to the belt conveyor 24. Firstly, the control device 5 drives the servomotors 18*a*, 18*b* and 22, thereby cancelling the sandwiching state by the sandwiching mechanism 12 (the sandwiching arms 14*a* and 14*b* and the sandwiching plate 15) (S13-1 in FIG. 17).

Subsequently, the control device 5 switches the valve 13*b* of the vacuum system 13 of FIG. 13 to the second state (S13-2 in FIG. 17), and cancels the adsorption state of the adsorption pads 11*p* with regard to the article P.

Figure 17:
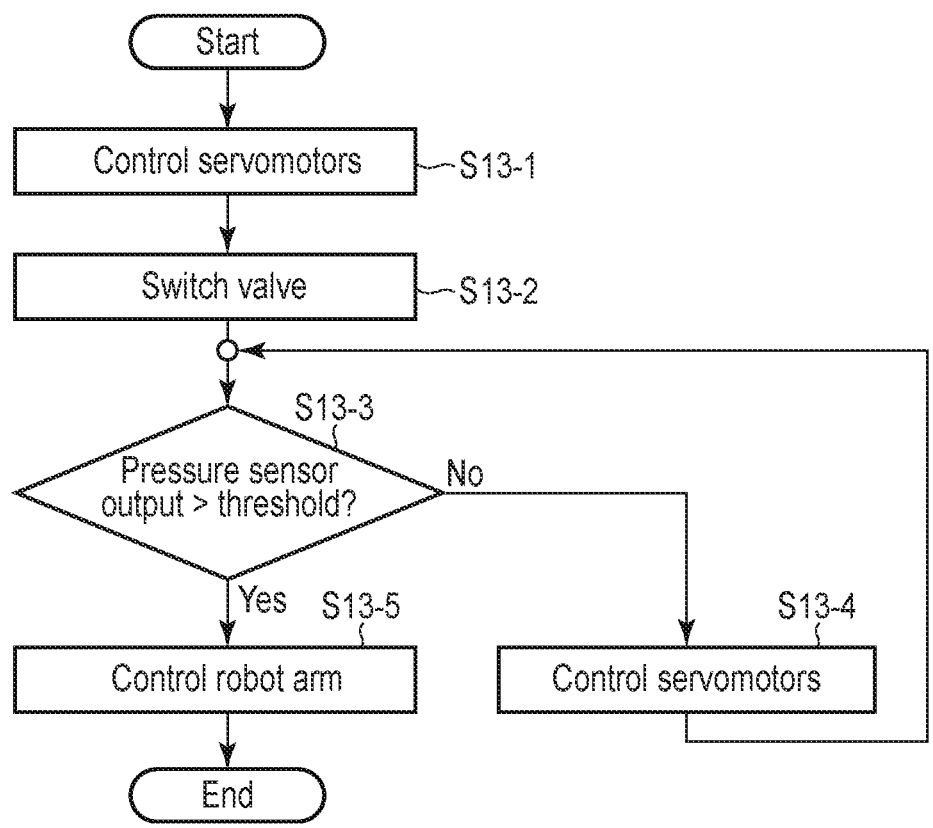
FIG. 17 is a flowchart for releasing an article which is adsorbed and held.

When the output of the pressure sensor 13*a* does not exceed a threshold set in advance in this state (S13-3 in FIG. 17), the control device 5 determines that the article P is not removed from the adsorption pads 11*p* and displaces the sandwiching mechanism 12 by driving the servomotors 18*a*, 18*b* and 22 (S13-4 in FIG. 17).

As an example of the displacement of the sandwiching mechanism 12, the sandwiching arms 14*a* and 14*b* or the sandwiching plate 15 are/is developed toward the article P. At this time, the article P is pushed out in a direction moving away from the adsorption pads 11*p*. In this way, the article P can be removed from the adsorption pads 11*p*. As a result, the article P can be transferred to the belt conveyor 24.

When the output of the pressure sensor 13*a* exceeds a threshold set in advance (S13-3 in FIG. 17), the control device 5 determines that the article P is removed from the adsorption pads 11*p*. At this time, the article P is transferred to the belt conveyor 24.

When any process is applied, the control device 5 controls the operation of the robot arm 4 such that the article holding device 2 is moved away from the article P (S13-5 in FIG. 17). Thus, release operation is completed.

Now, this specification explains the effect of the above embodiment.

According to the present embodiment, in the specification for sandwiching the both sides (one side and the other side) of an article P by the sandwiching mechanism 12 while the article P is adsorbed to the adsorption mechanism 11, the sandwiching mechanism 12 comprises the sandwiching arms 14*a* and 14*b* which are allowed to come into contact with one side of the article P, and the board-like sandwiching plate 15 which is allowed to come into planar contact with the other side of the article P. In this structure, a contact area with regard to the article P which is the object to be held can be increased while maintaining the followingness and responsiveness for holding operation so as to be constant. As a result, the article P can be stably held.

According to the present embodiment, each article P can be held from a lateral side (horizontal direction) as well as the upper side (perpendicular direction). In this way, the zippy article holding system 1 can be constructed. Specifically, when a job for unloading articles P stacked high is assumed, there is no need to use a long robot arm. A smaller system (in other words, a low-cost system which can be easily installed) can be realized. Further, holding in view of subsequent steps is allowed by expanding the holding direction. For example, in loading, articles P can be loaded while changing the posture of each article P.

Figure 11:
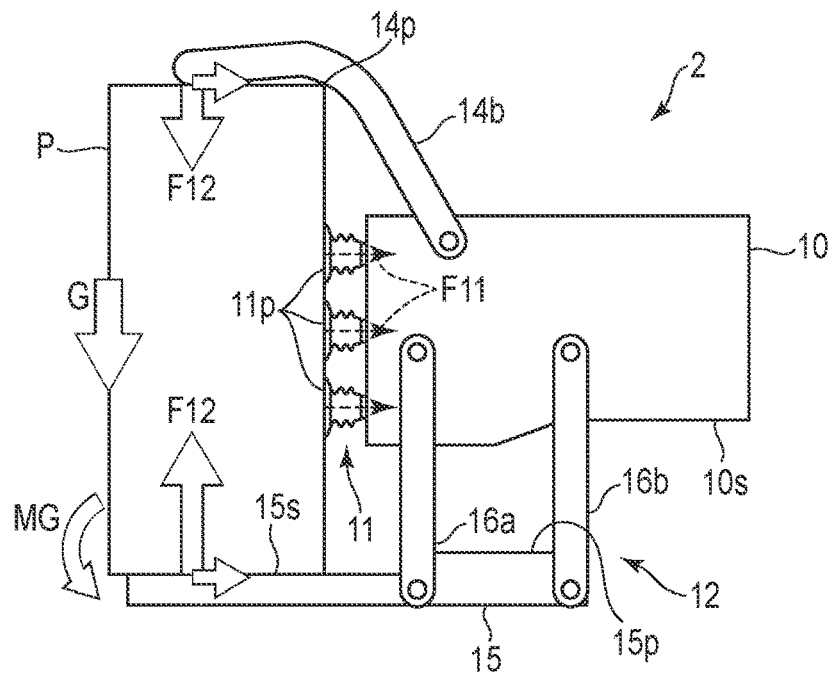
FIG. 11 is a side view showing a state in which a force is applied in a side-surface adsorption holding state.
Figure 12:
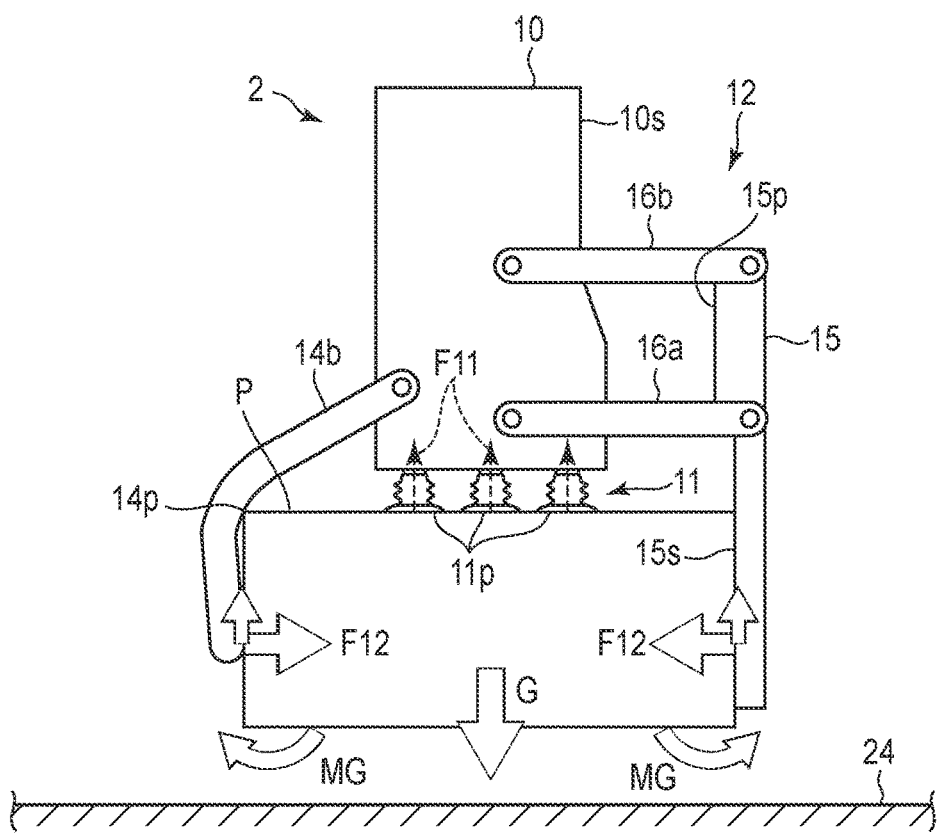
FIG. 12 is a side view showing a state in which a force is applied in an upper-surface adsorption holding state.

According to the present embodiment, for example, as shown in FIG. 11 and FIG. 12, each article P is held by the adsorption force F11 of the adsorption mechanism 11 and the sandwiching force F12 of the sandwiching mechanism 12 until the article P is transferred from the article container 7 to the belt conveyor 24. At this time, the sandwiching plate 15 and the link portions 16a and 16b are maintained so as to have a locational relationship orthogonal to each other. In this locational relationship, the perpendicular reaction applied to the sandwiching plate 15 has resistance by the rigidity of the above parallel link mechanism. In this structure, when, in particular, the surface of a heavy object is adsorbed, torque which receives gravity G is unnecessary. As a result, motor output can be reduced. Thus, the size and weight of the article holding device 2 can be reduced.

In this case, a moment load MG based on the distal end of the sandwiching plate 15 is applied to the parallel link mechanism. The moment load MG can be dealt with by the adsorption force F11 of the adsorption mechanism 11. For example, this effect is effectively exerted to the maximum in a state where the sandwiching plate 15 and the link portions 16a and 16b have a locational relationship orthogonal to each other (intersection angle=90°).

When the intersection angle between the sandwiching plate 15 and the link portions 16a and 16b is less than or equal to 90°, the contact area between the sandwiching plate 15 and the article P is less. This state has an advantage in which a surrounding obstacle can be easily avoided. However, this state is disadvantageous in terms of the stability of a holding state. Thus, for example, in the holding waiting posture shown in FIG. 3, the intersection angle between the sandwiching plate 15 and the link portions 16a and 16b should be preferably set to 90°. When the sandwiching plate 15 may interfere with a surrounding obstacle, the intersection angle may be changed to, for example, 70° to 90°.

According to the present embodiment, the contact plane 15s and the step surface 15p are structured on the sandwiching plate 15 so as to fit in the step shape of the bottom surface 10s of the holding main body 10. In this structure, for example, when the state of FIG. 8 transitions to the state of FIG. 9, the sandwiching plate 15 is allowed to slide into an article P without restricting the movement of the link portions 16a and 16b. As a result, the contact area of the holding main body 10 with regard to an article P is improved, thereby maintaining constant sandwiching stability.

Hereinafter, this specification explains a holding technology according to modification examples of the present invention.

In the above embodiment, the first sandwiching arm 14a and the second sandwiching arm 14b are driven by the servomotors 18a and 18b, respectively. Instead of this structure, the drive shafts 17a and 17b of both of the sandwiching arms 14a and 14b may be commonized. In this way, the number of servomotors can be decreased. As a result, both the cost and the weight of the article holding device 2 can be reduced at the same time.

According to the above embodiment, both of the sandwiching arms 14a and 14b have a structure which is not free excluding the drive shafts 17a and 17b. Instead of this structure, for example, one of or both of the sandwiching arms 14a and 14b may be divided into two. In the divisional portion, an underactuated shaft which operates by following drive via a wire pulley mechanism or a belt pulley mechanism from the drive shafts 17a and 17b may be provided. In this structure, the degree of freedom of the track drawn by the distal end (finger point) of each of the sandwiching arms 14a and 14b can be improved.

In the above embodiment, a specification for linearly driving the drive shafts 17a and 17b of both of the sandwiching arms 14a and 14b is assumed. Instead of this structure, a speed reduction mechanism may be interposed. In this way, the degree of freedom of a sandwiching time point can be improved. In this case, the sandwiching arms 14a and 14b may be rotated via the parallel link mechanism.

In the above embodiment, the sandwiching mechanism 12 (the sandwiching arms 14a and 14b and the sandwiching plate 15) and the parallel link mechanism are driven by using the servomotors 18a, 18b and 22. Instead of this structure, for example, a linear motor, a ball screw, a DC motor or a brushless DC motor may be used. Further, instead of incorporating the encoders into the servomotors 18a, 18b and 22, the encoders may be attached to the outside.

In the above embodiment, the specification of the vacuum supply to the adsorption mechanism 11 (adsorption pads 11p) is not specifically referred to. However, for example, vacuum supply may be applied to the adsorption pads 11p via a plurality of pipe systems, or vacuum supply may be applied to the adsorption pads 11p from a single pipe system. In this case, a throttle valve may be provided on the upstream of the adsorption pads 11p, thereby controlling the change of the flow rate. In this way, the air leak from the released adsorption pads 11p can be reduced. Even when a small article P or an article in which the curvature of the adsorption surface is great is adsorbed and held, a high vacuum pressure can be maintained. A throttle valve may be provided in all the adsorption pads 11p, or may be provided in some of them. For example, when a structure in which a throttle valve is provided only around a plurality of adsorption pads 11p is assumed, the vacuum pressure of the central portion can be maintained so as to be constant, and the air leak from the surrounding adsorption pads 11p can be decreased. As a result, an article P can be stably adsorbed.

In the above embodiment, the pressure sensor 13a is used to detect the state of adsorption of the adsorption mechanism 11 (adsorption pads 11p). Instead of this structure, a flow rate sensor may be used, or both a pressure sensor and a flow rate sensor may be used. Alternatively, another optical sensor may be combined. For example, an optical sensor may be attached to the holding main body 10 to measure the distance to an article P in an adsorption direction. Based on the measured distance, whether or not the adsorption pads 11p are less than or equal to an equilibrium length is determined to detect the state of adsorption.

In the above embodiment, the three processes of upper-surface adsorption holding, a side-surface adsorption holding and sandwiching holding are shown. As a matter of course, other holding specifications may be applied to the holding technology of the present invention. For example, in the initial posture of FIG. 1, FIG. 2, FIG. 7 and FIG. 8, only the adsorption mechanism 11 may be used for holding. While adsorbing an article P by the adsorption mechanism 11, the article P may be sandwiched by the parallel link mechanism and the sandwiching arms 14a and 14b in which the intersection angle is greater than or equal to 90°.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article holding device comprising:
   a holding main body;
   an adsorption mechanism which adsorbs and supports an article which is an object to be held; and
   a sandwiching mechanism which is provided on both sides so as to sandwich the adsorption mechanism, and sandwiches and holds the adsorbed article from both sides, wherein
   the sandwiching mechanism comprises:
      a sandwiching arm comprising an arm portion which comes into contact with one side of the article, and an arm rotation portion which rotatably connects the arm potion to the holding main body; and
      a sandwiching plate comprising a plate portion which comes into contact with an other side of the article, and a plate rotation portion which rotatably connects the plate portion to the holding main body,
   the sandwiching arm has a curved shape,
   a first surface facing the plate portion in the holding main body includes a step, and
   a second surface of the plate portion facing the first surface is configured to fit in a step shape of the first surface.

2. The article holding device of claim 1, wherein a plurality of sandwiching arms are provided in the holding main body.

3. The article holding device of claim 1, wherein
   the sandwiching plate is rotatably supported in the holding main body by the plate rotation portion, and
   the plate rotation portion is structured by providing a pair of link portions parallel to each other on both sides of the sandwiching plate, and the link portions have an end rotatably connected to the sandwiching plate, and the other end rotatably connected to the holding main body.

4. The article holding device of claim 1, wherein the sandwiching plate comprises a detection sensor which detects contact with the article on a surface which is in contact with the other side of the article.

5. An article holding system comprising:
   the article holding device of claim 1;
   an article detection device which detects the article;
   a robot arm configured to be attached to the article holding device, and causing the article holding device to approach or move away from the article based on a result of detection of the article detection device; and
   a control device which controls operation of the robot arm and the article holding device.

6. The article holding system of claim 5, wherein the control device is configured to perform controls for causing the article holding device to approach and hold the article from an upper side and perform controls for causing the article holding device to approach and hold the article from a lateral side based on the result of detection of the article detection device.

* * * * *